5807X

2 Sheets. Sheet. 1.

E. W. Carpenter,

Bench Plane.

Patented Jan. 30, 1830.

N. PETERS, PHOTO-LITHOGRAPHER, WASHINGTON, D. C.

5807X

2 Sheets. Sheet. 2.

E. W. Carpenter,

Bench Plane.

Patented Jan. 30. 1830.

X5801 Jan 31 1830

Emanuel W. Carpenter of Lancaster Pennsylvania

Letters Patent

The Schedule refer-ed to in these Letters Patent, and making part of the same, containing a description in the words, of the said Emanuel W. Carpenter himself of his improvement in the plane that makes the tongue in jointing boards, commonly called the Groove plane.—

---

To all persons to whom these presents shall come, Emanuel W. Carpenter, of the City of Lancaster, State of Pennsylvania, Plane maker, sends Greeting. Be it Known that I the said Emanuel W. Carpenter have invented, constructed, made and applied to use, a new and useful improvement in the plane that makes the tongue in jointing of boards commonly called the Groove plane. This improvement consists in making two mouths to the plane either square or oblique with a separate bit or iron & wedge for each leaving a small piece of the stalk between the two bits, nearly the size of the tongue intended to be made. And a further improvement on the iron or bits of the groove plane now in use, which consists in having two irons or bits, which when put together, resemble the bit or iron in common use.—

Figures 1, 2, 3:
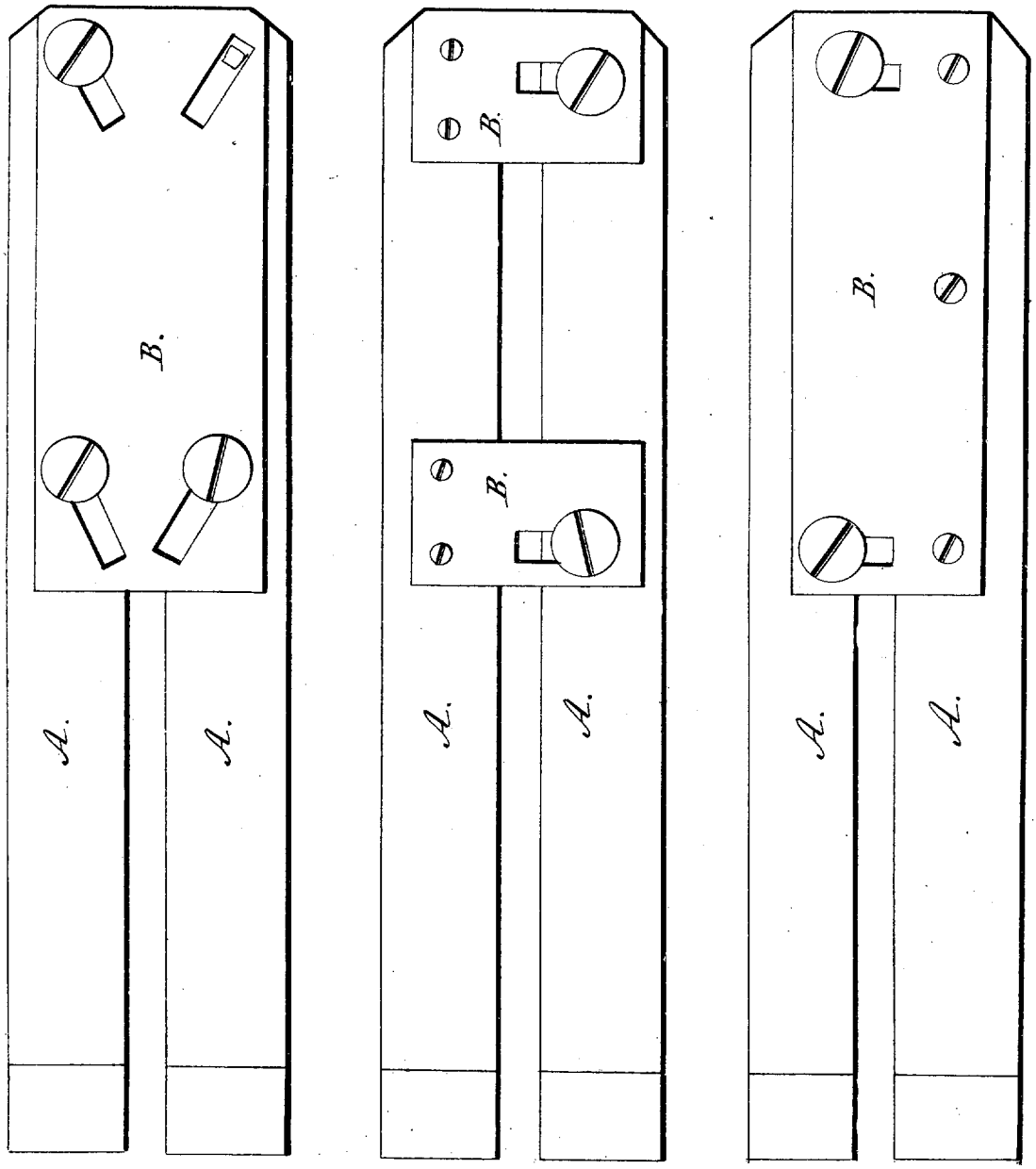
Figure 4:
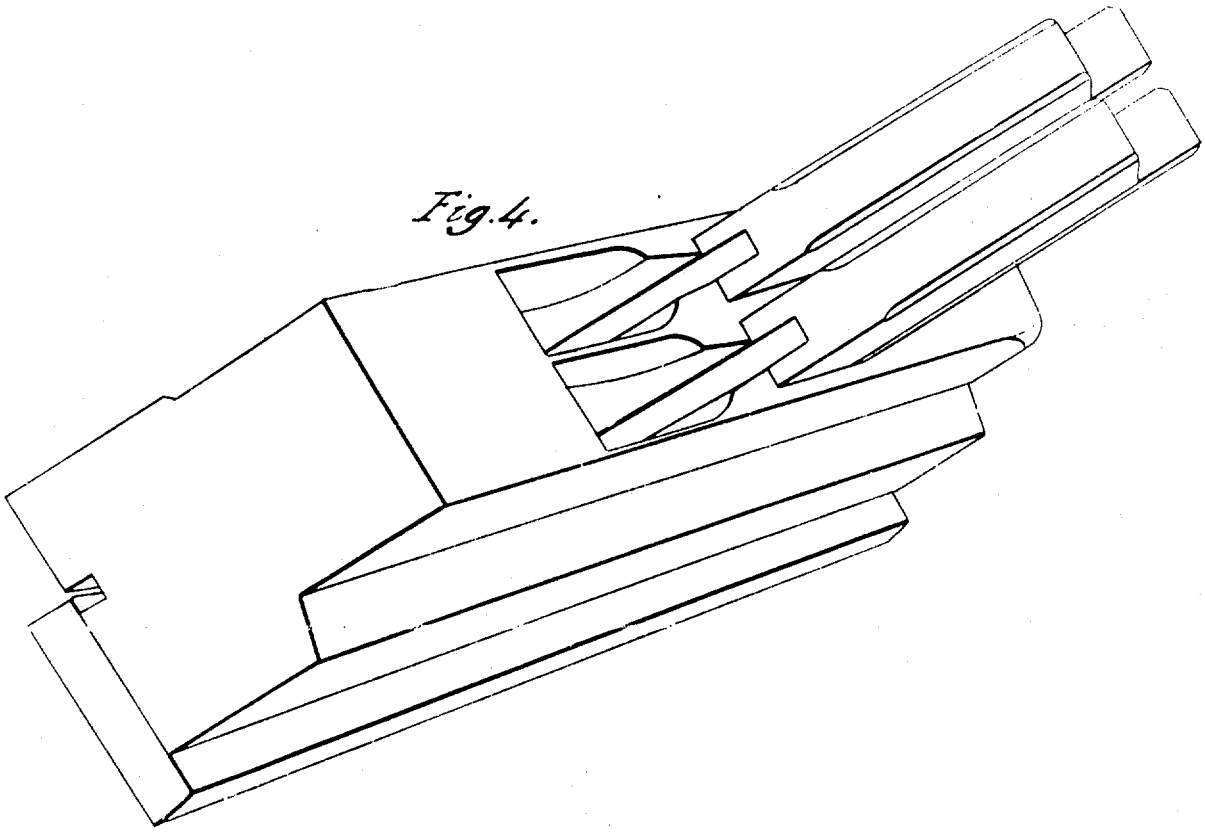

These two bits or irons are then fastened together by a plate or plates on the back thereof. Fig No 1. has the one side of the plate riveted to the one side of the bit or iron & near to each end of the plate is a mortise cut oversquare. A screw is then screwed into the other iron or bit opposite to these mortises, so that the irons or bits may be placed close together, or moved further apart & screwed fast at any necessary distance. Fig. No 2. has the same bits with Fig 1. with two plates on the back thereof, one of which extends to the top, so as to strengthen the bit at that part. The mortise opposite this plate is cut in one of the bits or irons. & by a screw in each of these plates are moved & fastened as in fig. one. Fig. No. 3. has the same bits, or irons as fig 1. with a mortise cut in each of them near the

X5807 top which [illegible] commence near the [illegible] sides of the bit [illegible] & diverge from each other as they progress towards the upper end of the bit. The plate on the back of these bits, have two rivets or screws, which slide in these mortises, & near the lower end of the plate are two mortises similar to those in the bits or irons which are also fastened by screws screwed into the bits or irons, so that by moving the plate upwards the bits or irons are drawn together & on drawing the plate downwards they are separated & may be screwed fast at any distance required.

In testimony that the above is a true specification of my said improvement, as above described I have hereto set my hand & seal the twenty fifth day of Nov ..... AD one thousand Eight hundred and twenty nine Witnesses
Samuel Dale
Mich^l. G. Dale Wm C. W. Carpenter (575 words)

(Patented 30. January 1830)

(Recd 5th Feby. 1838 and Recorded [illegible])